US009927614B2

(12) United States Patent
Vallius

(10) Patent No.: US 9,927,614 B2
(45) Date of Patent: Mar. 27, 2018

(54) AUGMENTED REALITY DISPLAY SYSTEM WITH VARIABLE FOCUS

(71) Applicant: Microsoft Technology Licensing, LLC, Redmond, WA (US)

(72) Inventor: Tuomas Vallius, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 52 days.

(21) Appl. No.: 14/982,385

(22) Filed: Dec. 29, 2015

(65) Prior Publication Data

US 2017/0184848 A1    Jun. 29, 2017

(51) Int. Cl.
*G02B 27/01* (2006.01)
*G02B 3/14* (2006.01)
(Continued)

(52) U.S. Cl.
CPC ........... *G02B 27/0172* (2013.01); *G02B 3/14* (2013.01); *G02B 5/3025* (2013.01); *G02B 27/0081* (2013.01); *G02B 27/0955* (2013.01); *G02B 27/4205* (2013.01); *G02B 27/4261* (2013.01); *G02B 27/4272* (2013.01); *G02F 1/29* (2013.01); *G06T 11/00* (2013.01);
(Continued)

(58) Field of Classification Search
CPC .................................................. G02B 27/0172
See application file for complete search history.

(56) References Cited

U.S. PATENT DOCUMENTS

| 5,751,388 A | 5/1998 | Larson |
| 5,886,822 A | 3/1999 | Spitzer |

(Continued)

FOREIGN PATENT DOCUMENTS

| EP | 2447757 A1 | 5/2012 |
| NO | 2006012679 A1 | 2/2006 |
| WO | 2015184412 A1 | 12/2015 |

OTHER PUBLICATIONS

"Electrically adjustable location of a projected image in AR via LC lens" by Hung-Shan Chen et al.*

(Continued)

*Primary Examiner* — Sang V Nguyen
(74) *Attorney, Agent, or Firm* — Mark K. Young; Mayer & Williams PC

(57) ABSTRACT

A near-eye optical display system that may be utilized in augmented reality applications and devices includes a diffractive waveguide having diffractive optical elements (DOEs) configured for in-coupling, exit pupil expansion, and out-coupling. An electrically-modulated tunable liquid crystal (LC) lens is located between the diffractive grating and the eyes of the user. A polarizing filter is located on the other side of the diffractive grating so that light from the real world enters the system with a particular polarization state, for example, TM-polarized. The tunable LC lens is configured to impart variable focus on light that has an opposite polarization state, for example TE-polarized. The optical display system is arranged to be polarization-sensitive so that virtual images from an imager are out-coupled from the diffractive waveguide with TE-polarization. The tunable LC lens may thus impart variable focus to the virtual images due to the lens' sensitivity to TE-polarization.

9 Claims, 13 Drawing Sheets

(51) Int. Cl.
*G02B 5/30* (2006.01)
*G02B 27/00* (2006.01)
*G02B 27/09* (2006.01)
*G02B 27/42* (2006.01)
*G02F 1/29* (2006.01)
*G06T 11/00* (2006.01)

(52) U.S. Cl.
CPC .............. *G02B 2027/014* (2013.01); *G02B 2027/0123* (2013.01); *G02B 2027/0127* (2013.01); *G02B 2027/0178* (2013.01); *G02B 2027/0185* (2013.01); *G02F 2001/294* (2013.01)

(56) References Cited

U.S. PATENT DOCUMENTS

| | | | |
|---|---|---|---|
| 6,140,980 | A | 10/2000 | Spitzer et al. |
| 7,408,601 | B1 | 8/2008 | Huang et al. |
| 7,667,783 | B2 | 2/2010 | Hong et al. |
| 8,135,227 | B2 | 3/2012 | Lewis et al. |
| 8,666,212 | B1 * | 3/2014 | Amirparviz .............. G02B 6/00 385/115 |
| 8,681,184 | B2 | 3/2014 | Seesselberg et al. |
| 2010/0079865 | A1 * | 4/2010 | Saarikko .............. G02B 6/0016 359/566 |
| 2011/0221656 | A1 | 9/2011 | Haddick et al. |
| 2012/0092328 | A1 | 4/2012 | Flaks et al. |
| 2012/0127062 | A1 | 5/2012 | Bar-Zeev et al. |
| 2012/0212399 | A1 * | 8/2012 | Border ................ G02B 27/017 345/8 |
| 2012/0235885 | A1 * | 9/2012 | Miller ................ G02B 27/0093 345/8 |
| 2013/0088413 | A1 | 4/2013 | Raffle et al. |
| 2013/0222384 | A1 * | 8/2013 | Futterer ................ G02B 5/32 345/426 |
| 2015/0346495 | A1 * | 12/2015 | Welch ................ G02B 27/0172 345/8 |

OTHER PUBLICATIONS

"Liquid Crystal lens with concentric electrodes and inter-electrode resistors" by Liwei Li, Doug Bryant, and Philip J. Bos.*
Chen et al. "Electrically adjustable location of a projected image in augmented reality via a liquid-crystal lens" (NPL), Optics Express, vol. 23, No. 22, dated Oct. 19, 2015 (Oct. 19, 2015), p. 28154, XP055288350, DOI: 10.1364/OE.23.028154.*
Chen et al., "Electrically adjustable location of a projected image in augmented reality via a liquid-crystal lens", in Journal of Optics Express, vol. 23, Issue 22, Oct. 19, 2015, pp. 28154-28162 (9 pages total).
Li et al., "Liquid crystal lens with concentric electrodes and inter-electrode resistors", in Journal of Liquid Crystal Reviews, vol. 2, Issue 2, Jul. 3, 2014, pp. 130-154. (25 pages total).
"International Search Report and Written Opinion Issued in PCT Application No. PCT/US2016/065225", dated Mar. 27, 2017, 13 Pages total.
Bimber, et al., "Modern approaches to augmented reality", in Proceedings of the 33rd International conference and Exhibition on Computer Graphics and Interactive Techniques, Jul. 30, 2006, (86 pages total).
"Second Written Opinion Issued in PCT Application No. PCT/US2016/065225", dated Sep. 11, 2017, 5 Pages.

* cited by examiner

US 9,927,614 B2

AUGMENTED REALITY DISPLAY SYSTEM WITH VARIABLE FOCUS

BACKGROUND

Augmented reality computing devices, such as head mounted display (HMD) systems and handheld mobile devices (e.g. smart phones, tablet computers, etc.), may be configured to display information to a user about virtual and/or real objects in a field of view of the user and/or a field of view of a camera of the device. For example, an HMD device may be configured to display, using a see-through display system, virtual environments with real-world objects mixed in, or real-world environments with virtual objects mixed in. Similarly, a mobile device may display such information using a camera viewfinder window.

SUMMARY

A near-eye optical display system that may be utilized in augmented reality applications and devices includes a waveguide having optical elements configured for in-coupling, exit pupil expansion, and out-coupling. An electrically-modulated tunable liquid crystal (LC) lens is located between the waveguide and the eyes of the user. A polarizing filter is located on the other side of the waveguide so that light from the real world enters the system with a particular polarization state, for example, TM-polarized. The tunable LC lens is configured to impart variable focus on light that has an opposite polarization state, for example TE-polarized. The optical display system is arranged to be polarization-sensitive so that virtual images from an imager are out-coupled from the waveguide with TE-polarization. The tunable LC lens may thus impart variable focus to the virtual images due to the lens' sensitivity to TE-polarization. However, because the real-world images are TM-polarized, they are not subject to the focusing by the tunable LC lens and reach the user's eye without being affected. The combination of the polarizing filter, polarization-sensitive out-coupling, and polarization-sensitive tunable LC lens provides for variable focus for virtual images while eliminating the need for an additional compensating lens that may be utilized in conventional variable focus solutions.

In an illustrative embodiment, the waveguide is arranged as a diffractive waveguide that includes one or more diffractive optical elements (DOEs) for the in-coupling, exit pupil expansion, and out-coupling. In alternative implementations, the waveguide may be configured using one or more of refractive waveguide, reflective waveguide, polarized waveguide, holographic waveguide, or prism waveguide and the in-coupling and out-coupling may be performed using one or more of dichroic mirrors, polarization-selective coatings or materials, or prism structures that operate in refraction or reflection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
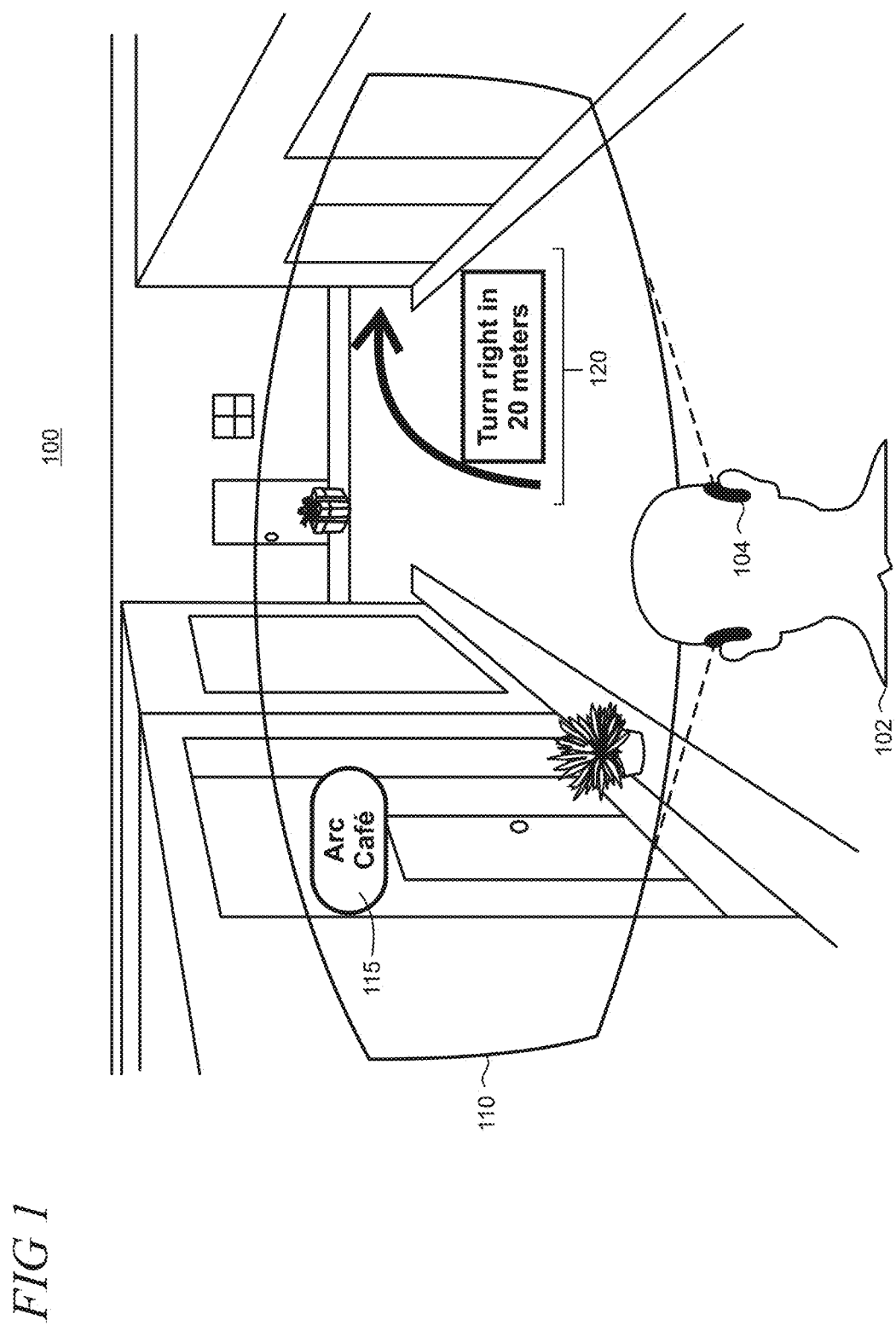
FIG. 1 shows an illustrative augmented reality environment, a portion of which is rendered within the field of view of a user of a head-mounted display (HMD) device.

FIG. 1 shows an illustrative augmented reality environment 100, a portion of which is rendered within the field of view of a user of a head-mounted display (HMD) device. An augmented reality environment typically combines real-world elements and computer-generated virtual elements to enable a variety of user experiences. In the illustrative example shown in FIG. 1, a user 102 can employ an HMD device 104 to experience an augmented reality environment 100 that is rendered visually on an optics display and may include audio and/or tactile/haptic sensations in some implementations. In this particular non-limiting example, the HMD device user 102 is physically walking in a real-world urban area that includes city streets with various buildings, stores, etc. The field of view (FOV), represented by the area 110 in FIG. 1, of the cityscape supported on HMD device 104 changes as the user moves through the environment and the device can render virtual images over the real-world view. Here, the virtual images illustratively include a tag 115 that identifies a restaurant business and directions 120 to a place of interest in the city.

Augmented reality display systems used in HMD and other devices that are implemented using diffractive optical waveguides typically produce virtual images in a virtual image plane that appears at a constant distance from the user's eyes. However, the real-world objects in the FOV can be located at any distance. For example, as shown in FIG. 1 the plant outside the restaurant is relatively closer to the user while the package at the end of the street is relatively farther from the user. Thus, a discrepancy can be manifested between a given real-world object and a virtual image in which only one of them is in focus. This focus mismatch can cause image blur and create eye stress and/or cognitive dissonance in some instances.

Figure 2:
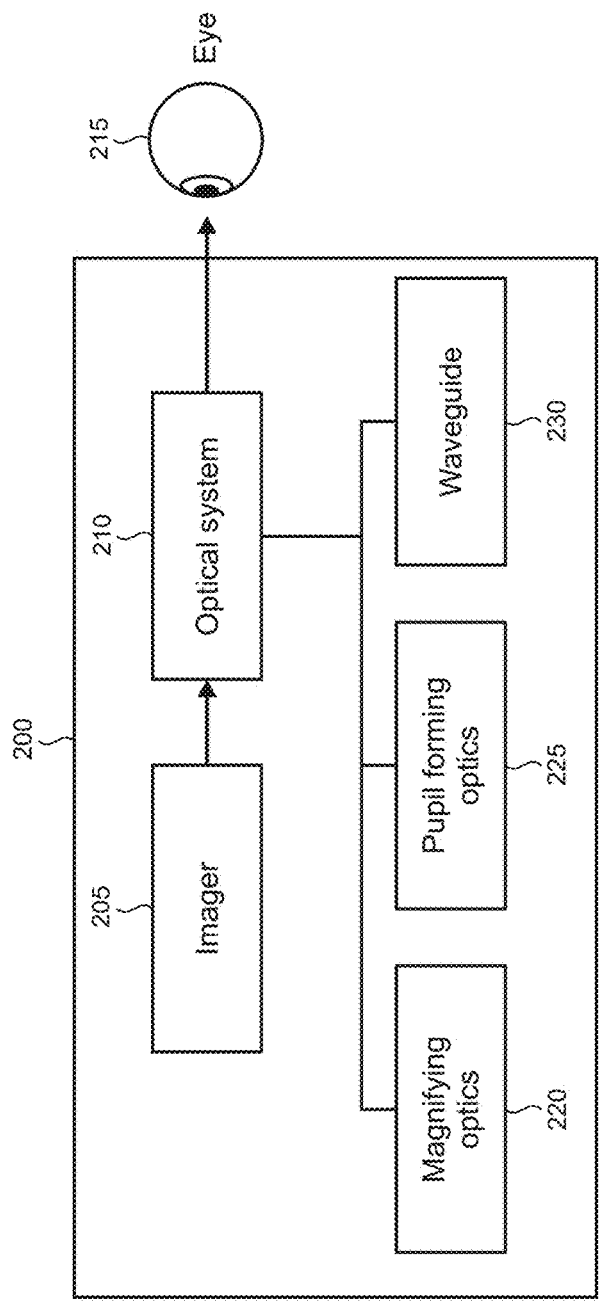
FIG. 2 shows a block diagram of an illustrative near-eye display system that can provide variable focus for virtual images in an augmented reality environment.

FIG. 2 shows a block diagram of an illustrative near-eye display system 200 that can be configured to provide variable focus for virtual images in an augmented reality environment. By implementing variable focus for virtual images, the focus discrepancy between virtual images and the real-world can be reduced or eliminated. In an illustrative embodiment, the near-eye display system uses a combination of diffractive optical elements (DOEs) that provide in-coupling of incident light into a waveguide, exit pupil expansion in two directions, and out-coupling of light out of the waveguide. Near-eye display systems are frequently used, for example, in head mounted display (HMD) devices in industrial, commercial, and consumer applications. Other devices and systems may also use polarization-sensitive gratings, as described below. The near-eye display system 100 is an example that is used to illustrate various features and aspects, and the polarization-sensitive gratings are not necessarily limited to near-eye display systems using DOEs.

System 200 may include an imager 205 that works with an optical system 210 to deliver images as a virtual display to a user's eye 215. The imager 205 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 205 may also include mirrors and other components that enable a virtual display to be composed and provide one or more input optical beams to the optical system. The optical system 210 can typically include magnifying optics 220, pupil forming optics 225, and one or more waveguides 230.

In a near-eye display system the imager does not actually shine the images on a surface such as a glass lens to create the visual display for the user. This is not feasible because the human eye cannot focus on something that is that close. Rather than create a visible image on a surface, the near-eye optical system 200 uses the pupil forming optics 225 to form a pupil and the eye 215 acts as the last element in the optical chain and converts the light from the pupil into an image on the eye's retina as a virtual display.

Figure 3:
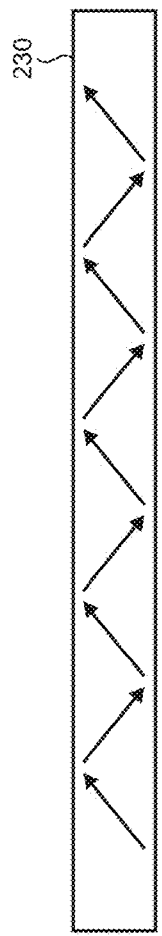
FIG. 3 shows propagation of light in a waveguide by total internal reflection.

The waveguide 230 facilitates light transmission between the imager and the eye. One or more waveguides can be utilized in the near-eye display system 200 because they are transparent and because they are generally small and light-weight (which is desirable in applications such as HMD devices where size and weight is generally sought to be minimized for reasons of performance and user comfort). For example, the waveguide 230 can enable the imager 205 to be located out of the way, for example, on the side of the head, leaving only a relatively small, light, and transparent waveguide optical element in front of the eyes. In one implementation, the waveguide 230 operates using a principle of total internal reflection, as shown in FIG. 3, so that light can be coupled among the various optical elements in the system 100.

Figure 4:
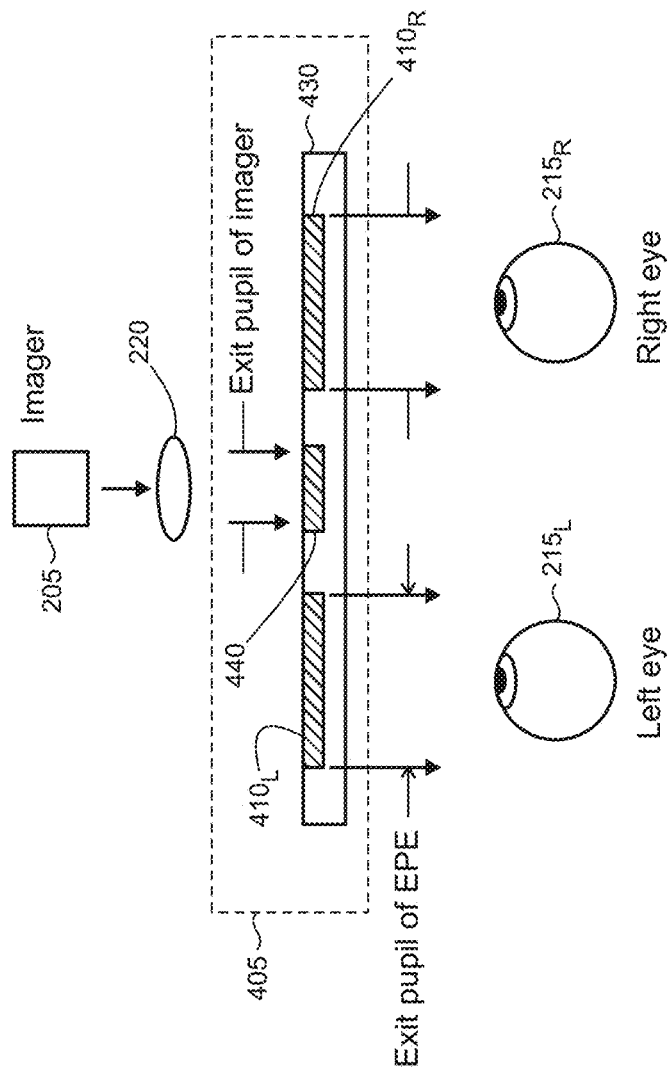
FIG. 4 shows a view of an illustrative exit pupil expander.

FIG. 4 shows a view of an illustrative exit pupil expander (EPE) 405. EPE 405 receives an input optical beam from the imager 205 through magnifying optics 220 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 405 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 4 for sake of clarity in exposition. The EPE 405 utilizes two out-coupling gratings, $410_L$ and $410_R$ that are supported on a waveguide 430 and a central in-coupling grating 440. The in-coupling and out-coupling gratings may be configured using multiple DOEs, as described in the illustrative example described below and shown in FIG. 8. While the EPE 405 is depicted as having a planar configuration, other shapes may also be utilized including, for example, curved or partially spherical shapes, in which case the gratings disposed thereon are non-co-planar.

Figure 5:
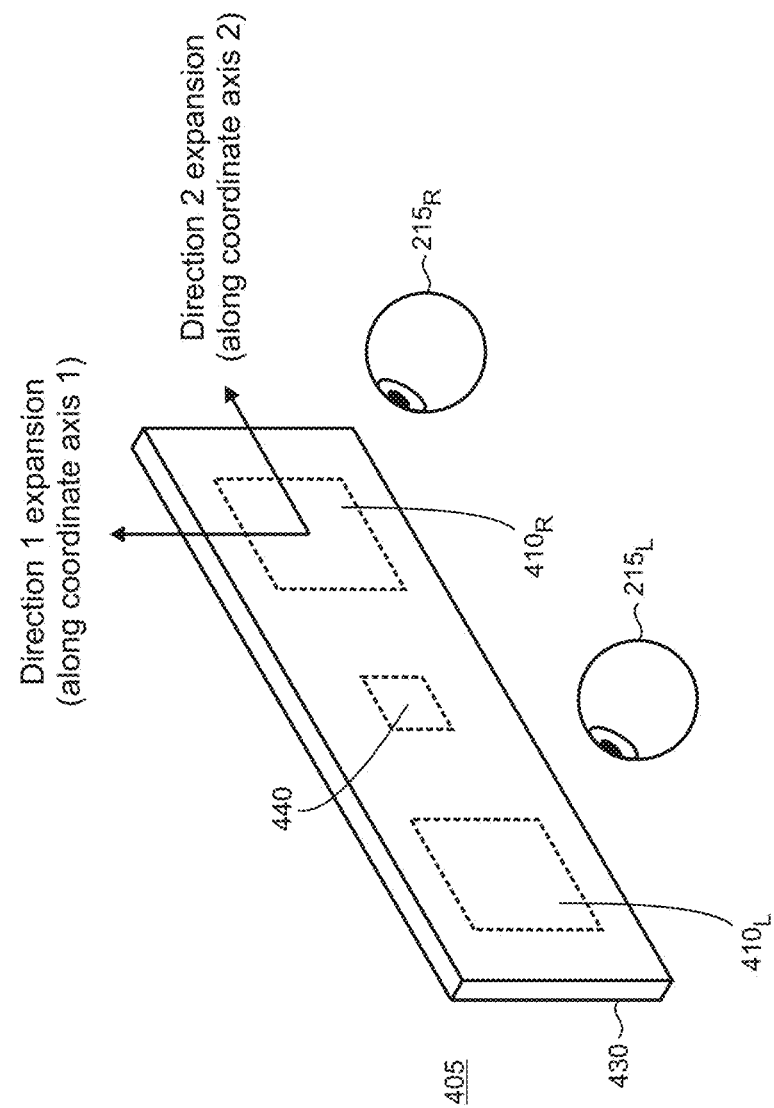
FIG. 5 shows a view of the illustrative exit pupil expander in which the exit pupil is expanded along two directions.

As shown in FIG. 5, the EPE 405 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near-eye display device is upright and forward facing, but less intuitive for other usage scenarios. The listed terms are not to be construed to limit the scope of the configurations (and usage scenarios therein) of the present augmented reality display system with variable focus.

As discussed above, conventional near-eye display systems using diffractive gratings typically provide a virtual image plane that is located at a constant distance from the user's eyes which can give rise to a discrepancy between real-world and virtual image focus. A variety of solutions have been implemented to provide variable virtual image focus. One exemplary existing solution is shown in FIG. 6 in which lenses are located on each side of a diffractive waveguide used in an EPE or other imaging display to deliver virtual images and/or objects 602 received from the imager 205 to the user's eye 215.

A focusing lens 605 or combination of multiple lenses is located on the eye-side of a diffractive waveguide 610. A compensating lens 615 is located on the front, light-incident side (i.e., real-world-side) of the diffractive waveguide 610. The focusing lens 605 is configured to vary the focus of the virtual images so that the virtual image can stay focused at varying distances in the real world. The compensating lens 615 on the real-world side of the waveguide compensates for the effects of the focus lens on the real world so that image planes of the real-world objects (e.g., objects 620) remain unaltered. In some implementations, the focus lens 605 and compensating lens 615 are operatively coupled to a suitable compensation system 625 that dynamically operates the lenses to keep the real-world images at the correct distance within the user's FOV as the user's gaze changes.

Figure 6:
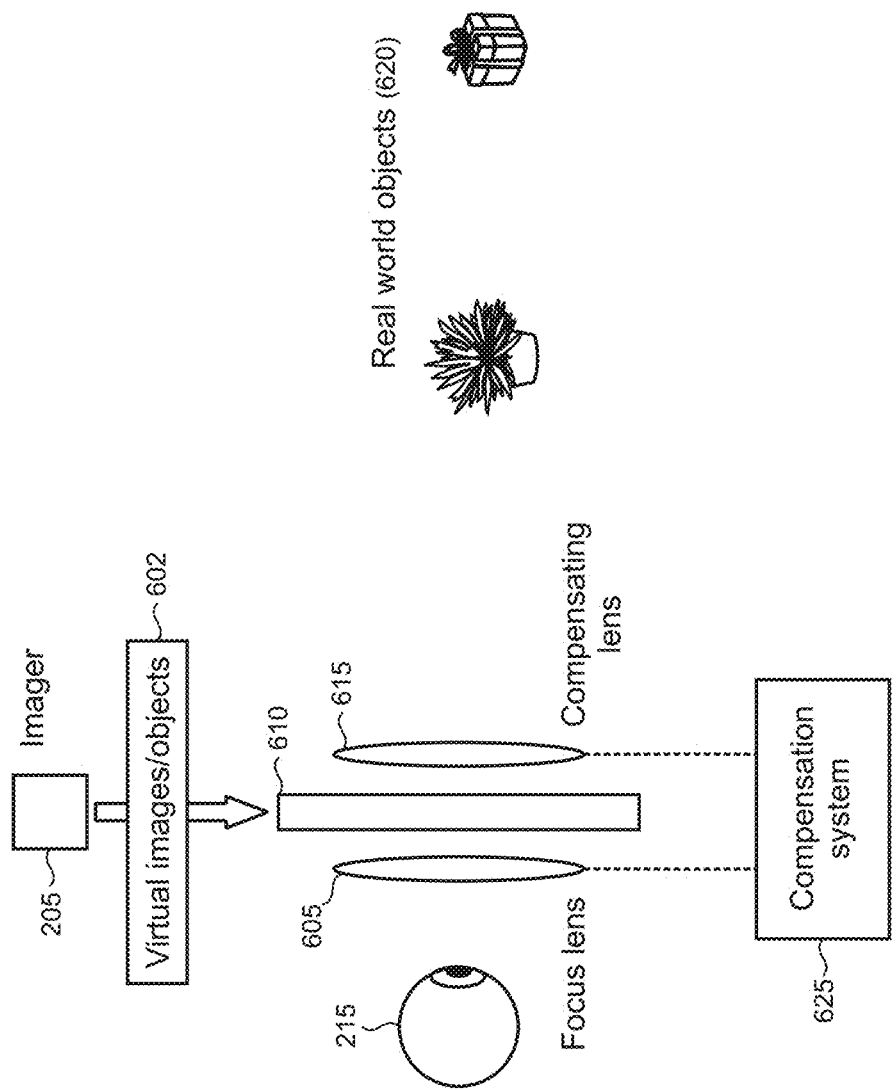
FIG. 6 shows an illustrative arrangement for implementing variable focus using a lens for changing the image plane for virtual images and a compensating lens.
Figure 7:
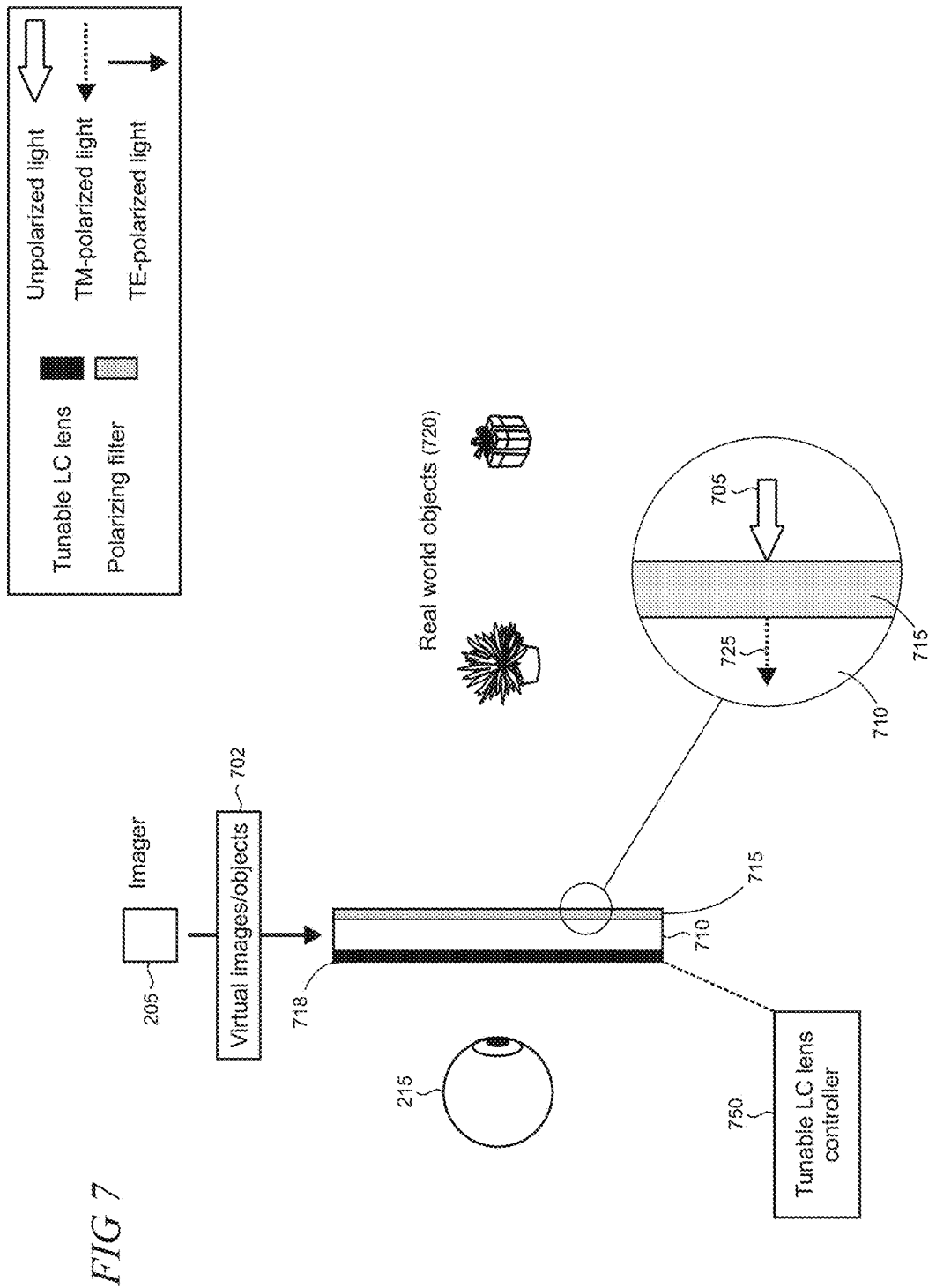
FIG. 7 shows an illustrative arrangement for implementing variable focus using a tunable liquid crystal (LC) lens that eliminates the need for a compensating lens.

While the multiple lens solution shown in FIG. 6 can produce satisfactory results in some implementations, it can be sub-optimal in applications such as HMD in which low weight and/or cost is an important design parameter. In comparison to multiple lens solution, FIG. 7 shows a single lens arrangement in which a polarizing filter 715 is disposed on the front, real-world-side of a diffractive waveguide 710 used, for example, in an EPE in a near-eye display system. While a diffractive waveguide is utilized in this particular illustrative example, other types of waveguides may also be utilized in alternative implementations. For example, such waveguides include refractive waveguides, reflective waveguides, holographic waveguides, polarized waveguides, and prism waveguides.

An electrically-modulated tunable liquid crystal (LC) lens 718 is disposed on the back, eye-side of the waveguide 710 and is configured, in this particular illustrative example, to act only upon light in a TM-polarized state to implement variable focus. In other implementations, the tunable LC lens 718 may be configured to act on TE-polarized light. The tunable LC lens may be configured to interoperate with controller 750 that provides electrical modulation to a layer of LC material in the lens to activate the material to achieve a specific optical curvature profile for the lens. In typical implementations the modulation is performed responsively to control signals (not shown) provided by various control and/or operating systems and the like supported on a given device such as an HMD device. The tunable LC lens 718 is described in more detail below in the text accompanying FIG. 11.

The polarizing filter 715 may be embodied using a separate layer, as shown in this particular illustrative example, but the filter can also be directly incorporated into the structure of the waveguide 710 in whole or part. In some implementations, the polarizing filter 715 can be partially or fully implemented as a discrete optical element that is separate from the waveguide, and/or the filter may incorporate its own waveguide structure. The polarizing filter 715 can be configured and shaped to suit a given application. For example, the filter can be planar, curved, or use a combination of planar and curved elements. In some applications, the polarizing filter can be incorporated into a protective shield, lens, or other suitable component of a display system. The polarizing filter can be implemented using a molded polymer substrate in some implementations which may be beneficial in applications where weight and bulk is sought to be minimized, such as in HMD systems and devices.

In this illustrative example, the polarizing filter 715 is linearly polarizing so that unpolarized light 705 impinging on the optical display system from the external real world (e.g., from real-world objects 720) enters the system as TM-polarized light, as indicated by arrow 725. In other implementations, the polarizing filter 715 can be configured to filter the impinging unpolarized light into TE-polarized light. The filter 715 can also be configured to impose circular polarization (e.g., left- or right-hand circular polarization) in some cases.

The optical system including the imager 205 and diffractive waveguide 710 is configured so that the virtual images/objects 702 are out-coupled in a TE-polarization state through the tunable LC lens 718 to the user's eye 215 (in alternative implementations, the out-coupled virtual images can be in TM-polarized state when the polarizing filter is configured to pass TE-polarized light). As the out-coupled virtual images have a TE-polarization state, they can be acted upon by the tunable LC lens 718 to impart variable focus. However, the tunable LC lens is configured for sensitivity to TE-polarized light therefore it does not affect the focus of TM-polarized light from the real world. The combination of the polarizing filter, polarization-sensitive out-coupling, and polarization-sensitive tunable LC lens can thus eliminate the need for an additional compensating lens as utilized in the multiple lens solution discussed above.

The polarization sensitive out-coupling may be implemented, for example, by configuring the diffractive waveguide to out-couple TE-polarized light to the tunable LC lens while passing through non-TE-polarized light (i.e., TM-polarized light) without diffracting it out to the tunable LC lens. In some implementations, the light engine in the imager 205 may be configured to output TE-polarized light, and in other implementations both the imager and diffractive waveguide may be configured with sensitivity to TE-polarization.

Figure 8:
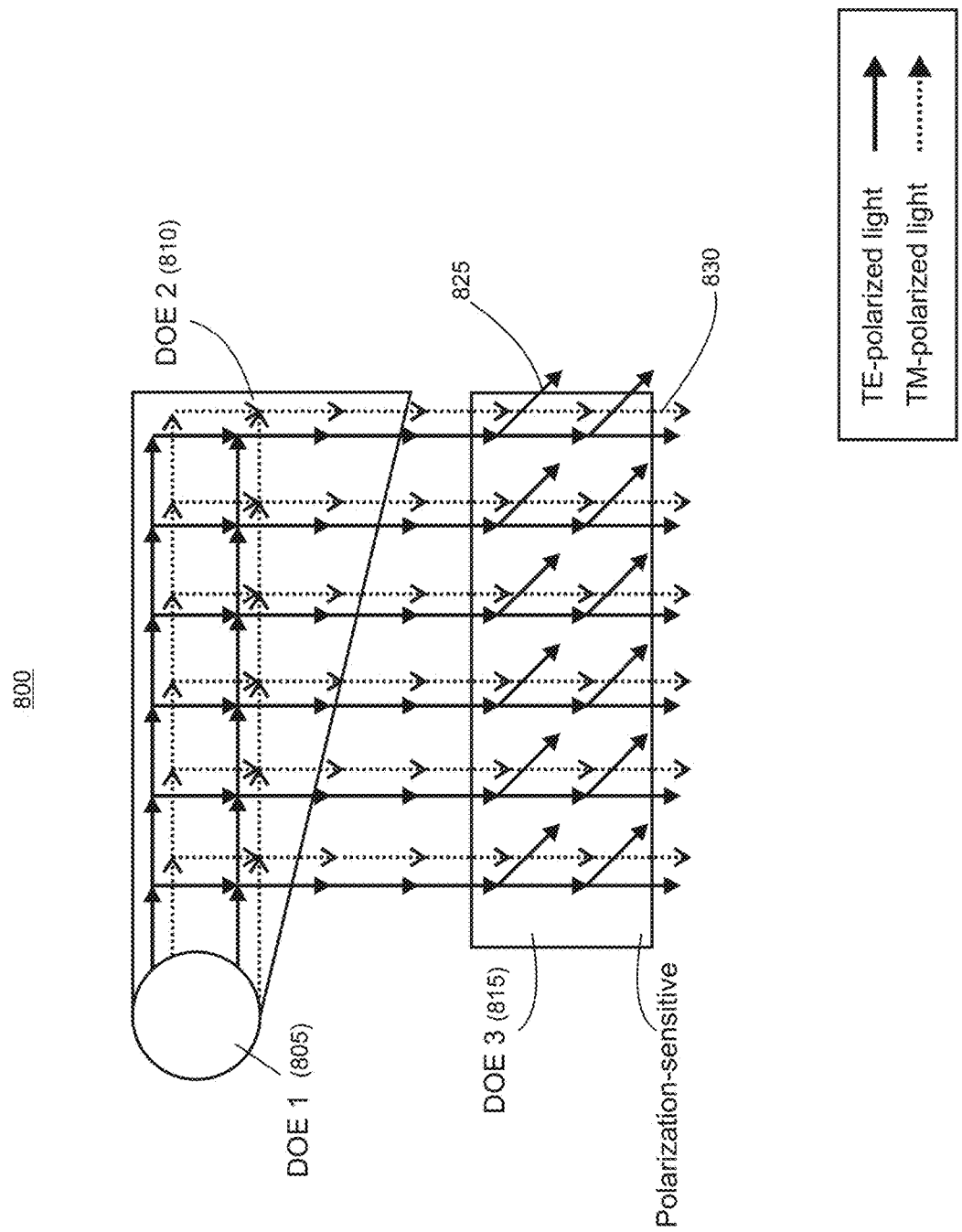
FIG. 8 shows an illustrative arrangement of three DOEs configured for in-coupling, exit pupil expansion, and out-coupling in which the out-coupling DOE is implemented using a polarization-sensitive grating.

FIG. 8 shows an illustrative arrangement 800 of three DOEs that may be used with, or as a part of, a diffractive waveguide to provide in-coupling, expansion of the exit pupil in two directions, and out-coupling in an EPE in which the out-coupling DOE is implemented as a polarization-sensitive grating. The polarization-sensitive out-coupling DOE operates to out-couple TE-polarized imaging light to the tunable LC lens (not shown). In this particular illustrative example, DOEs are utilized for in-coupling and out-coupling, however in other implementations either or both the in-coupling and out-coupling may be performed using one or more of dichroic mirrors, polarization-selective coatings or materials, or prism structures that operate in refraction or reflection.

Each DOE is an optical element comprising a periodic structure that can modulate various properties of light in a periodic pattern such as the direction of optical axis, optical path length, and the like. The first DOE, DOE 1 (indicated by reference numeral 805), is configured to couple an imaging beam from an imager into the waveguide. The imaging beam can be TE-polarized in some implementations or randomly polarized (i.e., unpolarized) light may be utilized. The second DOE, DOE 2 (810), expands the exit pupil in a first direction along a first coordinate axis, and the third DOE, DOE 3 (815), expands the exit pupil in a second direction along a second coordinate axis and couples light out of the waveguide (it is noted that the various directions of propagation in FIG. 8 are depicted in an arbitrary manner and that the directions are not necessarily orthogonal).

DOE 1 thus functions as an in-coupling grating and DOE 3 functions as an out-coupling grating while expanding the pupil in one direction. DOE 2 may be considered as an intermediate grating that functions to couple light between the in-coupling and out-coupling gratings while performing exit pupil expansion in another direction. Using such intermediate grating may eliminate a need for conventional functionalities for exit pupil expansion in an EPE such as collimating lenses. In this particular example, DOE 3 is configured to be polarization-sensitive so that it diffracts only TE-polarized light out of the grating. The TM-polarized light, which is not acted upon by the tunable LC lens (due to its sensitivity to only TE-polarized light as described above), is passed out of DOE 3 without being out-coupled by diffraction.

This polarization-sensitive out-coupling function for TE-polarized light is representatively shown in FIG. 8 by reference numeral 825 while the pass-through function for TM-polarized light is representatively indicated by reference numeral 830. The tunable LC lens can thus act on the out-coupled virtual images to impart variable focus due to the TE-polarization sensitivity of the lens. In alternative implementations, polarization sensitivity can be implemented in various portions of one or more of the DOEs in the arrangement 800. For example, the DOE portions can include grating structures and/or other features configured to perform a conversion from one polarization state to another so that an input at the in-coupling grating DOE 1 in one polarization state (e.g., TM-polarized) is converted by the grating features to the other polarization state (e.g., TE-polarized) prior to being out-coupled from the out-coupling grating DOE 3. In another illustrative implementation, one or more of the DOEs can be configured with polarization sensitivity to diffract TE-polarized light to the tunable LC lens to thereby impart variable focus to the virtual images.

The three-dimensional microstructure forming the out-coupling grating, DOE 3, can be configured to be polarization-sensitive by manipulating a combination of grating parameters that relate to grating line asymmetry and fill ratio. Grating depth is another exemplary parameter that can be manipulated in combination with grating line asymmetry and fill ratio in some cases. These parameters can be selected, adjusted, and/or tuned to implement polarization sensitivity in DOE 3 so that only TE-polarized light from the imager is out-coupled from DOE 3 while TM-polarized light passes through DOE 3 with minimal/no diffraction interaction. In some implementations, the grating parameters can be iteratively manipulated in a given grating design until polarization-sensitivity is achieved which meets some predetermined criteria.

Figure 9:
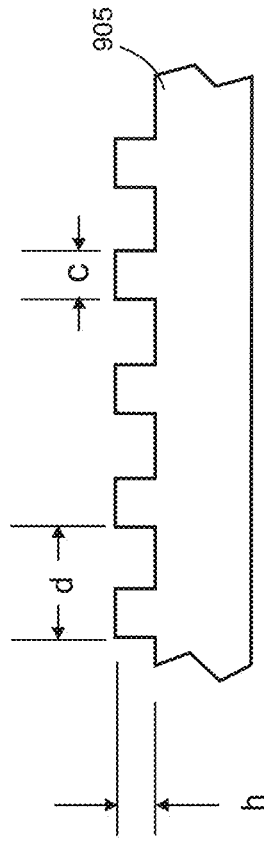
FIG. 9 shows a profile of a portion of an illustrative diffraction grating that has straight gratings.
Figure 10:
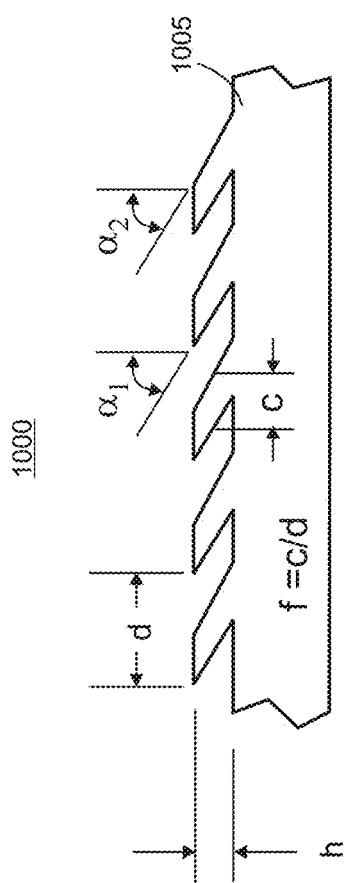
FIG. 10 shows an asymmetric profile of a portion of an illustrative diffraction grating that has asymmetric or slanted gratings.

Grating line asymmetry is described in more detail while making reference to FIGS. 9 and 10. FIG. 9 shows a profile of straight (i.e., non-slanted) grating features 900 (referred to as grating bars, grating lines, or simply "gratings"), that are formed in a substrate 905. By comparison, FIG. 10 shows grating features 1000 formed in a substrate 1005 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 9 and 10, the grating period is represented by d, the grating height by h (also referred to as grating "depth"), bar width by c, and the fill factor by f, where f=c/d. The slanted gratings in FIG. 10 may be described by slant angles $\alpha_1$ and $\alpha_2$.

In alternative embodiments, the out-coupling DOE 3 may be configured to be polarization-sensitive by using birefringent materials such as liquid crystal, anisotropic crystal or strained materials. In some implementations, gratings can be filled with a liquid crystal material that effectively removes the refractive index contrast for one polarization state.

Figure 11:
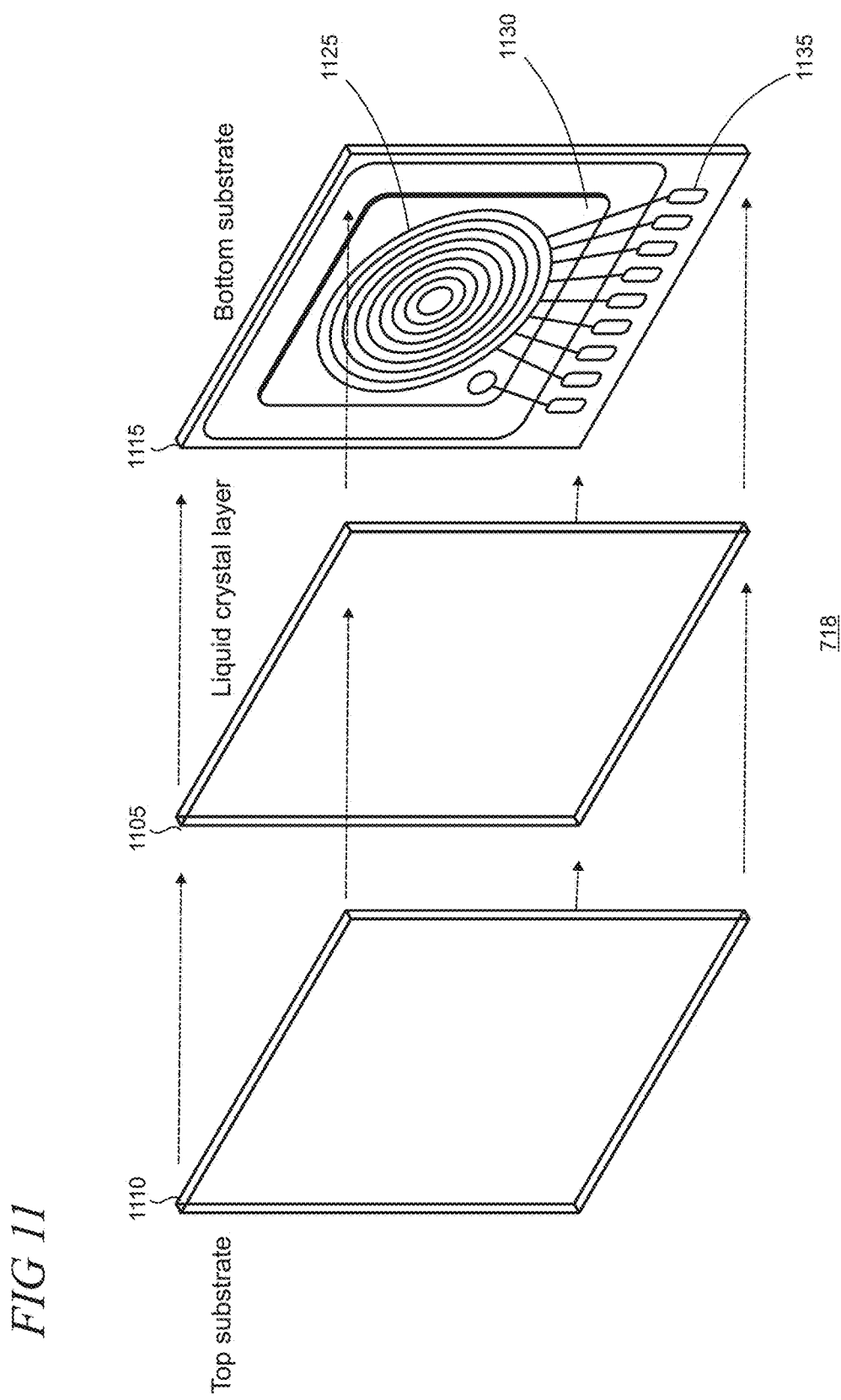
FIG. 11 shows an exploded view of an illustrative tunable LC lens.

FIG. 11 shows an exploded view of an illustrative electrically-modulated tunable LC lens, for example lens 718 (FIG. 7). The lens 718 comprises a layer 1105 of LC material that sits between a top substrate 1110 and a bottom substrate 1115 (it is noted that the terms top and bottom are used for reference purposes and the lens 718 can be used in a variety of orientations depending on the needs of a given application). The top and bottom substrates can be made from polymer and/or glass depending on implementation and may further be configured as lenses and/or have other optical characteristics or functions (e.g., filtering, absorbing, polarizing, diffracting, waveguiding, or the like) in some cases. The assembled lens is typically configured as a compact package, for example having a few millimeters of thickness depending on application, and can be implemented as a discrete component. For example, the tunable LC lens may be located and/or affixed to the eye side of a diffractive waveguide as a thin optical element. The tunable LC lens may also be incorporated into a diffractive waveguide, lens system, or other suitable portion or component of an optical display system.

The LC layer 1105 includes floating electrodes (not shown) that interoperate with concentric ring electrodes 1125 that are located in a bond layer 1130 proximate to the bottom substrate 1115. When an electric profile from the controller 750 (FIG. 7) is applied through edge conductors (representatively indicated by reference numeral 1135) to a particular region of the LC layer, the floating electrodes slide into place to fill gaps between the concentric electrodes. The floating electrodes enable increased optical performance of the tunable lens by reducing light scattering that could otherwise occur in the gaps between the concentric electrodes. Phase sampling across the lens plane is also increased through utilization of the floating electrodes which may further improve lens performance. Charge state in the LC layer is also readily maintained which makes the tunable LC lens highly energy efficient to preserve power which is typically limited in battery-powered systems such as HMD devices.

By controlling the electric profile applied to various portions of the LC layer 1105, the optical wavefront of the LC lens is analog adjustable which enables infinitely-variable focus at any desired power, ranging between the maximum plus and maximum minus optical power of the lens. In addition, the wavefront shape can be controlled with fine-granularity by applying energy to specific regions of the lens. Such fine-grain control can be utilized to control the optics in a given display system to implement not only variable virtual image focus but support various features and user experiences and also correct for aberrations, distortion, refractive errors and the like as well. For example, in some implementations, the tunable LC lens can be configured to correct errors in the optical system and/or for deficiencies in the user's vision such as myopia, hyperopia, or astigmatism. Such built-in correction in the optical display system can eliminate the need for corrective glasses or contact lenses in some cases when the system in incorporated in devices such as HMDs.

In some implementations, the tunable LC lens can be configured to impart variable focus to change the focal depth of virtual images, real-world images, or both virtual images and real-world images. For example, the polarizing filter may be implemented using LC or other suitable elements that enable control over the polarization state of the real-world light so that the polarization-sensitive LC lens is able to affect the focus of real-world images/objects.

Figure 12:
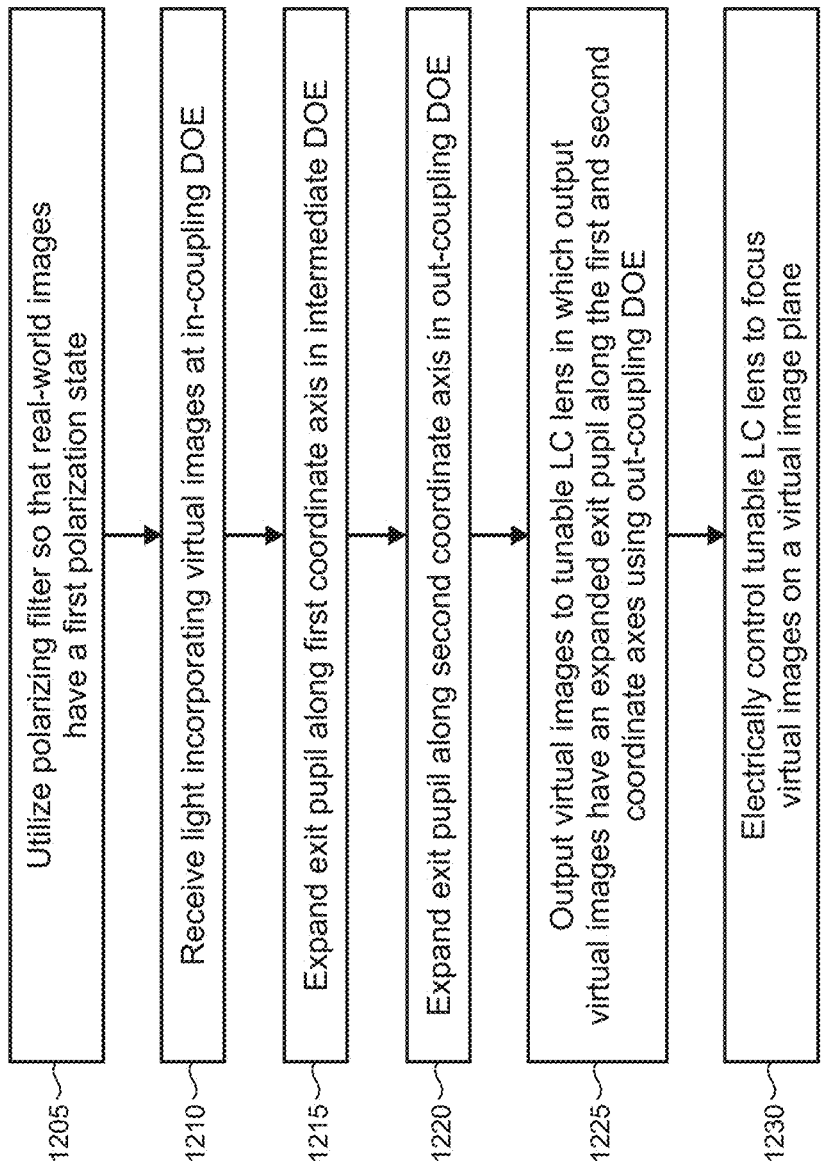
FIG. 12 shows an illustrative method.

FIG. 12 is a flowchart of an illustrative method 1200. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1205, the front of a near-eye display system (i.e., a forward-facing portion of the system on which light from the external real world impinges) is configured to utilize one or more polarizing filters that are deployed in combination with one or more downstream polarization-sensitive gratings and a tunable LC lens. In step 1210, light incorporating virtual images from an imager is received at an in-coupling DOE disposed in an EPE. The use of the polarizing filter enables light from the external real world to be in a polarization state that is opposite (e.g., orthogonal) to the virtual images that are out-coupled from the EPE to an electrically tunable LC lens, as described below. The in-coupling DOE interfaces with a downstream intermediate DOE that is disposed in the EPE. The intermediate DOE is configured to interface with a downstream out-coupling DOE.

In step 1215, the exit pupil of the received light is expanded along a first coordinate axis in the intermediate DOE. In step 1220, the exit pupil is expanded along a second coordinate axis in an out-coupling DOE. In step 1225, the out-coupling DOE diffracts light out as an output to the tunable LC lens from the EPE with an expanded exit pupil relative to the received light at the in-coupling DOE along the first and second coordinate axes. The out-coupling DOE is configured with polarization sensitivity so that it out-couples virtual images to the tunable LC lens in a polarization state that is opposite to the polarized real-world light. The tunable LC lens is also polarization-sensitive to the opposite polarization state to that of the real-world light. Thus, as described above, operation of the tunable LC lens does not impact the focus of real-world images which can obviate the need for a conventional compensating lens.

In step 1230, the tunable LC lens may be electrically controlled to focus the out-coupled virtual images onto a virtual image plane. The electrical control can be varied to impart variable focus so that the virtual image plane can be located at different distances to correspond with the locations of objects in the real world.

Variable focus may be incorporated into a display system that is utilized in a virtual or augmented reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 13:
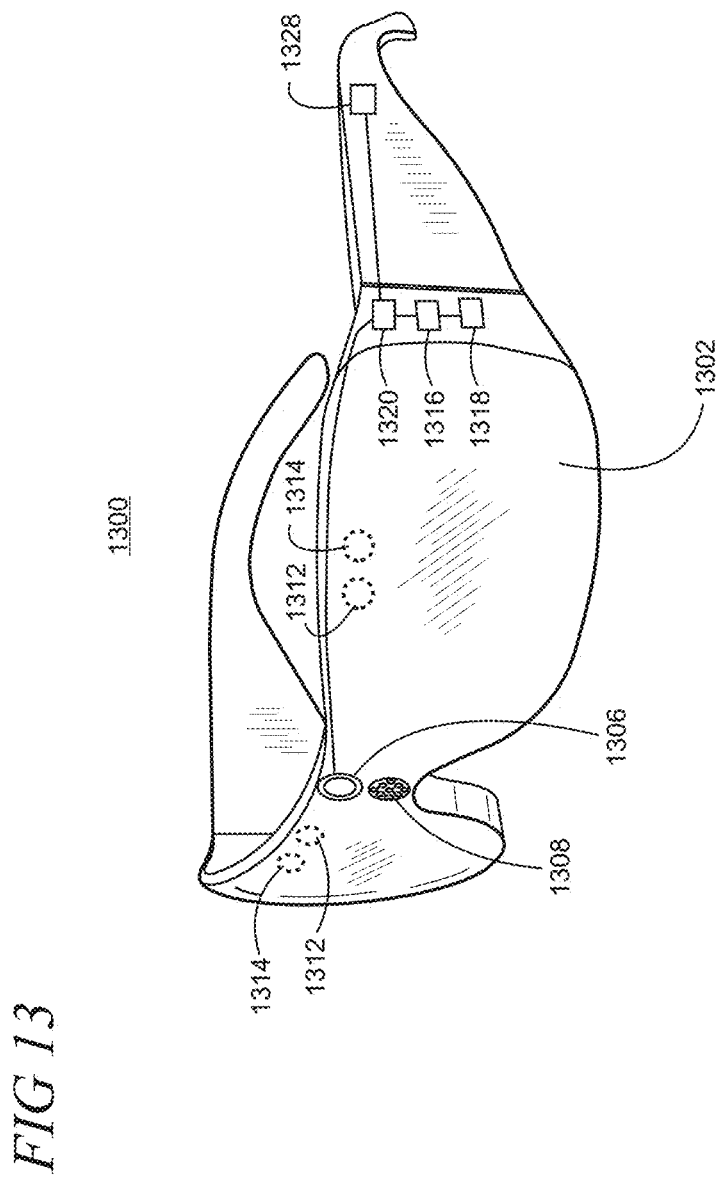
FIG. 13 is a pictorial view of an illustrative example of a virtual reality or augmented reality head mounted display (HMD) device.
Figure 14:
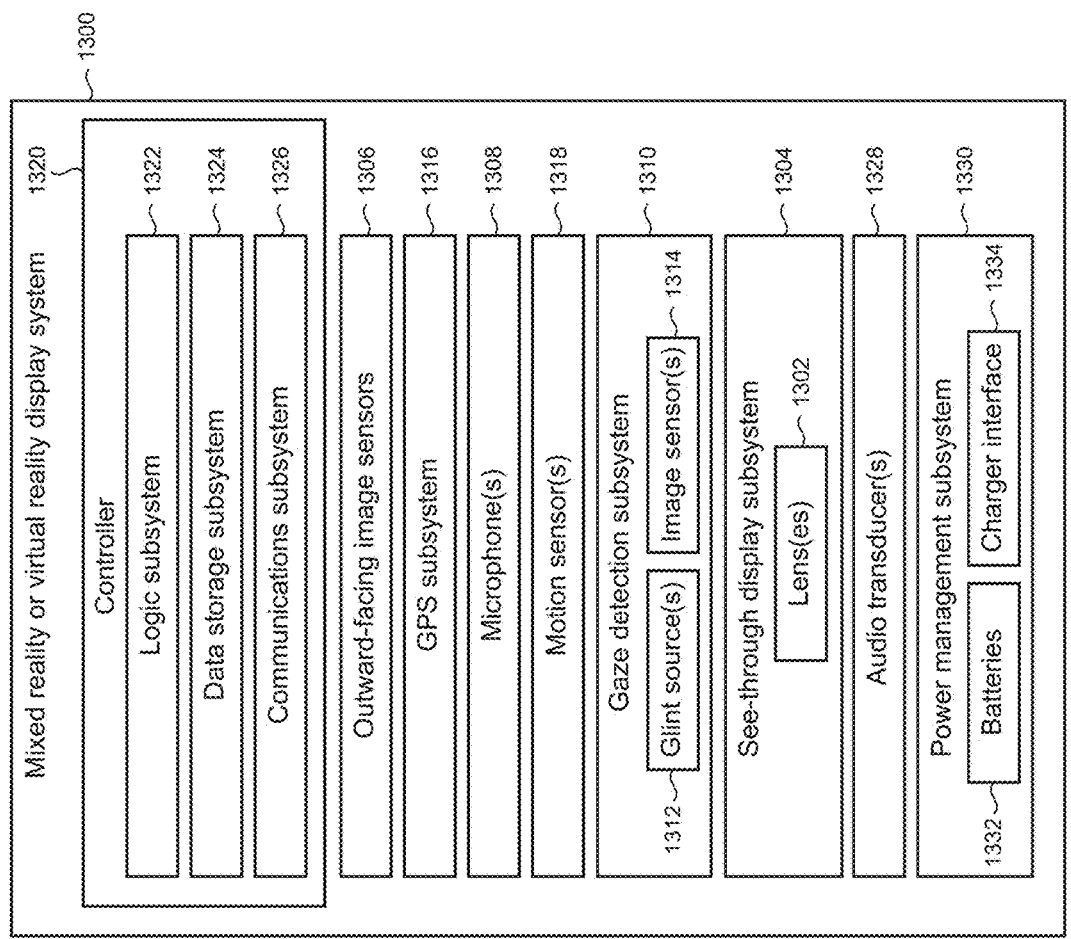
FIG. 14 shows a block diagram of an illustrative example of a virtual reality or augmented reality HMD device.

FIG. 13 shows one particular illustrative example of a see-through, augmented reality or virtual reality display system 1300, and FIG. 14 shows a functional block diagram of the system 1300. Display system 1300 comprises one or more lenses 1302 that form a part of a see-through display subsystem 1304, such that images may be displayed using lenses 1302 (e.g. using projection onto lenses 1302, one or more waveguide systems incorporated into the lenses 1302, and/or in any other suitable manner). Display system 1300 further comprises one or more outward-facing image sensors 1306 configured to acquire images of a background scene and/or physical environment being viewed by a user, and may include one or more microphones 1308 configured to detect sounds, such as voice commands from a user. Outward-facing image sensors 1306 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 1300 may further include a gaze detection subsystem 1310 configured for detecting a direction of gaze of each eye of a user or a direction or location of focus, as described above. Gaze detection subsystem 1310 may be configured to determine gaze directions of each of a user's eyes in any suitable manner. For example, in the illustrative example shown, a gaze detection subsystem 1310 includes one or more glint sources 1312, such as infrared light sources, that are configured to cause a glint of light to reflect from each eyeball of a user, and one or more image sensors 1314, such as inward-facing sensors, that are configured to capture an image of each eyeball of the user. Changes in the glints from the user's eyeballs and/or a location of a user's pupil, as determined from image data gathered using the image sensor(s) 1314, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1310 may have any suitable number and arrangement of light sources and image sensors. In some implementations, the gaze detection subsystem 1310 may be omitted.

The display system 1300 may also include additional sensors. For example, display system 1300 may comprise a global positioning system (GPS) subsystem 1316 to allow a location of the display system 1300 to be determined. This may help to identify real-world objects, such as buildings, etc. that may be located in the user's adjoining physical environment.

The display system 1300 may further include one or more motion sensors 1318 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 1306. The use of motion data may allow changes in gaze location to be tracked even if image data from outward-facing image sensor(s) 1306 cannot be resolved.

In addition, motion sensors 1318, as well as microphone(s) 1308 and gaze detection subsystem 1310, also may be employed as user input devices, such that a user may interact with the display system 1300 via gestures of the eye, neck and/or head, as well as via verbal commands in some cases. It may be understood that sensors illustrated in FIGS. 13 and 14 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1300 can further include a controller 1320 having a logic subsystem 1322 and a data storage subsystem 1324 in communication with the sensors, gaze detection subsystem 1310, display subsystem 1304, and/or other components through a communications subsystem 1326. The communications subsystem 1326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1324 may include instructions stored thereon that are executable by logic subsystem 1322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1300 is configured with one or more audio transducers 1328 (e.g., speakers, earphones, etc.) so that audio can be utilized as part of an augmented reality or virtual reality experience. A power management subsystem 1330 may include one or more batteries 1332 and/or protection circuit modules (PCMs) and an associated charger interface 1334 and/or remote power interface for supplying power to components in the display system 1300.

It may be appreciated that the display system 1300 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 15:
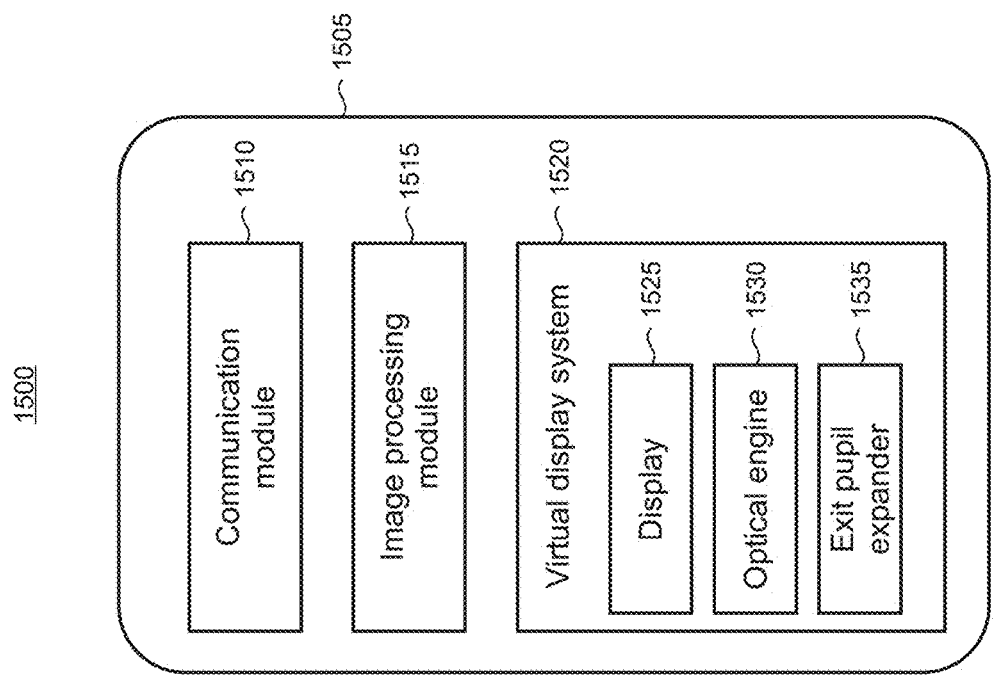
FIG. 15 shows a block diagram of an illustrative electronic device that incorporates an augmented reality display system with variable focus.

As shown in FIG. 15, an augmented reality display system with variable focus can be used in a mobile or portable electronic device 1500, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1500 includes a housing 1505 to house a communication module 1510 for receiving and transmitting information from and to an external device, or a remote system or service (not shown).

The portable device 1500 may also include an image processing module 1515 for handling the received and transmitted information, and a virtual display system 1520 to support viewing of images. The virtual display system 1520 can include a micro-display or an imager 1525 and an optical engine 1530. The image processing module 1515 may be operatively connected to the optical engine 1530 to provide image data, such as video data, to the imager 1525 to display an image thereon. An EPE 1535 can be optically linked to an optical engine 1530. The EPE may incorporate or be part of a display system that supports variable focus for virtual images.

An augmented reality display system with variable focus may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present augmented reality display system with variable focus are now presented by way of illustration and not as an exhaustive list of all embodiments. An example includes an optical display system, comprising: a polarizing filter configured to filter light from real-world objects into a first polarization state; a tunable liquid crystal (LC) lens that is configured to impart variable focus on light that has a second polarization state, the second polarization state being orthogonal to the first polarization state; and a waveguide including an out-coupling element for out-coupling light to the tunable LC lens wherein the out-coupling element is configured for sensitivity to the second polarization state so that only light in the second polarization state is out-coupled to the tunable LC lens and subject to variable focus while light from real-world objects in the first polarization state is not subject to variable focus.

In another example the waveguide comprises a first diffractive optical element (DOE) having an input surface and configured as an in-coupling grating to receive one or more optical beams from an imager having a second polarization state as an input, a second DOE configured for pupil expansion of the one or more optical beams along a first direction, and a third DOE having an output surface and configured for pupil expansion of the one or more optical beams along a second direction, and further configured as an out-coupling grating to out-couple, as an output to the tunable LC lens from the output surface, one or more optical beams with expanded pupil relative to the input. In another example, grating features in at least one of the DOEs are configured according to one or more of grating asymmetry, grating depth, or grating fill factor so as to impart polarization-sensitivity to the second polarization state. In another example, the waveguide is one of diffractive waveguide, refractive waveguide, reflective waveguide, holographic waveguide, prism waveguide, or combinations thereof, and the out-coupling element is one of diffractive optical element, dichroic mirror, polarization-selective coating, or prism, and further comprising an in-coupling element configured to in-couple light into the waveguide in which the in-coupling element is one of diffractive optical element, dichroic mirror, polarization-selective coating, or prism. In another example, the polarizing filter is disposed in a forward-facing portion of the optical display system upon which light from the real-world objects impinges and the tunable LC lens is disposed in a portion of the optical display system between the waveguide and eyes of a user.

A further example includes an electronic device supporting an augmented reality experience including virtual images and real-world images, comprising: a data processing unit; an optical engine operatively connected to the data processing unit for receiving image data from the data processing unit and producing virtual images; a polarizing filter configured to filter light from real-world images into a first polarization state; an electrically-modulated tunable liquid crystal (LC) lens configured to impart variable focus to light having a second polarization state that is orthogonal to the first polarization state; and an exit pupil expander, responsive to one or more input optical beams incorporating the virtual images, comprising a structure on which multiple diffractive optical elements (DOEs) are disposed, in which the exit pupil expander is configured to provide one or more out-coupled optical beams, using one or more of the DOEs, as a near-eye display with an expanded exit pupil, and wherein at least one of the DOEs has a portion configured to be polarization-sensitive so the exit pupil expander outputs the virtual images having the second polarization state to the LC lens in the out-coupled optical beams.

In another example, the exit pupil expander provides pupil expansion in two directions. In another example, the electronic device further includes an imager operatively connected to the optical engine to form virtual images based on the image data and to generate one or more input optical beams incorporating the virtual images having the second polarization state. In another example, the imager includes one of light emitting diode, liquid crystal on silicon device, organic light emitting diode array, or micro-electro mechanical system device. In another example, the LC lens is configured to impart variable focus to one or more of virtual images or real-world images. In another example, the electronic device is implemented in a head mounted display device or portable electronic device. In another example, the LC lens comprises floating electrodes and concentric electrodes wherein the floating electrodes are configured to fill gaps between the concentric electrodes when the LC lens is electrically modulated to assume a particular wavefront shape to thereby impart variable focus to the virtual images. In another example, the LC lens includes a layer of LC material located between respective top and bottom substrates and further comprising a controller configured to electrically modulate the LC lens to assume the particular wavefront shape to thereby impart focus to the out-coupled optical beams, the controller being adapted to apply an electric profile to various portions of the LC material layer through electrical contacts to the concentric electrodes. In another example, LC lens is further configured to be infinitely variable between a range of optical powers.

A further example includes a method for providing variable focus to virtual images in an augmented reality display system that supports virtual images and real-world images, comprising: utilizing a polarizing filter so that the real-world images have a first polarization state; receiving, from an imager, light incorporating virtual images at an in-coupling diffractive optical element (DOE) disposed in an exit pupil expander; expanding an exit pupil of the received virtual images along a first coordinate axis in an intermediate DOE disposed in the exit pupil expander; expanding the exit pupil along a second coordinate axis in an out-coupling DOE disposed in the exit pupil expander; outputting the virtual images to a tunable liquid crystal (LC) lens, the output virtual images having an expanded exit pupil relative to the received light at the in-coupling DOE along the first and second coordinate axes using the out-coupling DOE; and electrically controlling the tunable LC lens to focus the virtual images on a virtual image plane of variable distance away from the system wherein the LC lens is polarization-sensitive whereby the LC lens imparts focus to light in a second polarization state and does not impart focus to light in the first polarization state, and wherein the out-coupling DOE is polarization-sensitive whereby the out-coupling DOE is configured to out-couple light in the second polarization state from the exit pupil expander to the LC lens and pass through light in the first polarization state without out-coupling.

In another example, the first and second polarization states include one of linearly-polarized or circularly-polarized. In another example, the method is performed in a near-eye display system. In another example, the electric control comprises analog adjustability of LC material in the lens between various wavefront shapes by application of power to an arrangement of electrodes in the LC lens. In another example, one or more of the in-coupling DOE, intermediate DOE, or out-coupling DOE include portions having grating features configured to perform a conversion on an input to the in-coupling DOE from the first polarization state to the second polarization state. In another example, the polarization conversion is performed upstream from the outputting at the out-coupling DOE.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An electronic device supporting an augmented reality experience for a device user, the augmented reality experience including virtual images and images of real-world objects, comprising:
    a data processing unit;
    an optical engine operatively connected to the data processing unit for receiving image data from the data processing unit and producing virtual images;
    a polarizing filter configured to filter light from real-world objects into a first polarization state;
    an electrically-modulated tunable liquid crystal (LC) lens configured to impart variable focus to light having a second polarization state that is orthogonal to the first polarization state; and
    an exit pupil expander, responsive to one or more input optical beams incorporating the virtual images, comprising a waveguide on which multiple diffractive optical elements (DOEs) are disposed, wherein the waveguide has a front side facing the real-world objects and a back side, located opposite the frontside, facing an eye of the user when the electronic device is operated,
        in which the exit pupil expander is configured to provide one or more out-coupled optical beams, using one or more of the DOEs, as a near-eye display with an expanded exit pupil,
        wherein the LC lens is located on the back side of the waveguide, and the polarizing filter is located on the front side of the waveguide,
        wherein at least one of the DOEs has a portion configured to be polarization-sensitive so the exit pupil expander outputs the virtual images having the second polarization state in the out-coupled optical beams as a first input to the LC lens, and
        wherein a second input to the LC lens includes light from the real-world objects in the first polarization state.

2. The electronic device of claim 1 in which the exit pupil expander provides pupil expansion in two directions.

3. The electronic device of claim 1 further including an imager operatively connected to the optical engine to form virtual images based on the image data and to generate one or more input optical beams incorporating the virtual images having the second polarization state.

4. The electronic device of claim 3 in which the imager includes one of light emitting diode, liquid crystal on silicon device, organic light emitting diode array, or micro-electro mechanical system device.

5. The electronic device of claim 1 in which the LC lens is configured to impart variable focus to one or more of virtual images or real-world images.

6. The electronic device of claim 1 as implemented in a head mounted display device or portable electronic device.

7. The electronic device of claim 1 in which the LC lens comprises floating electrodes and concentric electrodes wherein the floating electrodes are configured to fill gaps between the concentric electrodes when the LC lens is electrically modulated to assume a particular wavefront shape to thereby impart variable focus to the virtual images.

8. The electronic device of claim 7 in which the LC lens includes a layer of LC material located between respective top and bottom substrates and further comprising a controller configured to electrically modulate the LC lens to assume the particular wavefront shape to thereby impart focus to the out-coupled optical beams, the controller being adapted to apply an electric profile to various portions of the LC material layer through electrical contacts to the concentric electrodes.

9. The electronic device of claim 1 in which the LC lens is further configured to be infinitely variable between a range of optical powers.

* * * * *